(12) United States Patent
Jiang et al.

(10) Patent No.: US 10,889,742 B1
(45) Date of Patent: Jan. 12, 2021

(54) MODIFIED POLYHISTIDINE SUITABLE FOR BEING USED AS A SUPRAMOLECULAR SHALE INHIBITOR, METHOD OF PREPARING THE SAME AND ITS APPLICATION IN WATER-BASED DRILLING FLUIDS

(71) Applicants: CHINA UNIVERSITY OF PETROLEUM (BEIJING), Beijing (CN); Beijing Shida Bocheng Technology Co., Ltd, Beijing (CN)

(72) Inventors: Guancheng Jiang, Beijing (CN); Yinbo He, Beijing (CN); Lili Yang, Beijing (CN); Kai Wang, Beijing (CN); Tengfei Dong, Beijing (CN); Xiaohu Quan, Beijing (CN); Kaixiao Cui, Beijing (CN); He Shi, Beijing (CN)

(73) Assignees: CHINA UNIVERSITY OF PETROLEUM (BEIJING), Beijing (CN); BEIJING SHIDA BOCHENG TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/887,869

(22) Filed: May 29, 2020

(51) Int. Cl.
*C09K 8/035* (2006.01)
*C08G 69/48* (2006.01)
*C09K 8/05* (2006.01)

(52) U.S. Cl.
CPC .............. *C09K 8/035* (2013.01); *C08G 69/48* (2013.01); *C09K 8/05* (2013.01); *C08G 2261/72* (2013.01)

(58) Field of Classification Search
None
See application file for complete search history.

(56) References Cited

U.S. PATENT DOCUMENTS

2011/0250639 A1* 10/2011 Ernst ........................ C12P 21/02
 435/69.1
2014/0290955 A1* 10/2014 Chen ........................ E21B 37/06
 166/305.1
2017/0096595 A1* 4/2017 Dhulipala ............... C09K 8/528

FOREIGN PATENT DOCUMENTS

| CN | 106367042 A | 2/2017 |
| CN | 108239523 A | 7/2018 |
| CN | 109233762 A | 1/2019 |
| JP | 2007023074 A | 2/2007 |

OTHER PUBLICATIONS

Xuan Yang et al., "Natural Gas Industry" vol. 36, No. 2; 20160226; , Preparation and Evaluation of Environmentally-friendly and High-efficiency Shale Inhibitor Polylysine, pp. 84-91).
Zhong Hanyi et al., "Petroleum Drilling Technology" vol. 38 No. 1; 20100125; Characteristics and Research Progress of Amine Shale Inhibitors, pp. 104-108).

\* cited by examiner

Primary Examiner — Jeffrey D Washville
(74) Attorney, Agent, or Firm — Calfee Halter & Griswold LLP

(57) ABSTRACT

The present disclosure relates to the technical field of water-based drilling fluid, in particular to a modified polyhistidine suitable for being used as a supramolecular shale inhibitor, a method of preparing the same, and its application in water-based drilling fluids. The modified polyhistidine has a histidine polymerization main chain comprising a structural unit, which is represented by Formula (1) and attached with a modifying group, and the histidine polymerization main chain has a histidine polymerization degree of 6-9. The modified polyhistidine provided by the present disclosure is a degradable biological material and has the advantage of environmental friendliness; when the modified polyhistidine is used as a shale inhibitor, it can take advantage of its supermolecular property to effectively inhibit the hydration expansion of montmorillonite which is the most important expansion mineral in shale, and exhibits excellent inhibition effect and desirable temperature resistance.

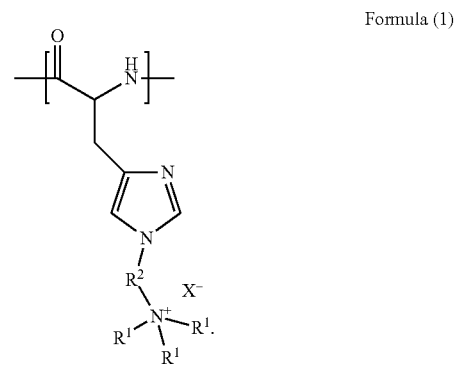

Formula (1)

10 Claims, No Drawings

MODIFIED POLYHISTIDINE SUITABLE FOR BEING USED AS A SUPRAMOLECULAR SHALE INHIBITOR, METHOD OF PREPARING THE SAME AND ITS APPLICATION IN WATER-BASED DRILLING FLUIDS

FIELD

The present disclosure relates to the technical field of water-based drilling fluids, in particular to a modified polyhistidine suitable for being used as a supramolecular shale inhibitor, a method of preparing the same and its application in water-based drilling fluids.

BACKGROUND

The exploration and development of the shale gas have promoted the upgrade and transformation of the energy structure in the People's Republic of China (PRC), and accelerated the pace of China transforming from the "oil-dominant" era to the "gas-emerging" era, and promoted the development of energy industry towards a cleaner direction. During the drilling process of shale gas, the oil-based drilling fluid was primarily used for drilling shale gas due to the water sensitivity of shale. Although the oil-based drilling fluid exhibited excellent performance in the aspects of inhibiting the hydration expansion of the shale and preventing the borehole wall from instability, the oil-based drilling fluid had the defects of high cost, heavy pollution and being difficult for disposal; along with the continuous and in-depth awareness of the environmental protection concept, the development of a water-based drilling fluid with desirable shale inhibition performance to replace the oil-based drilling fluid is imperative. The shale inhibitor is one of the key technologies of water-based drilling fluids used for shale gas drilling.

Potassium chloride (KCl) had been widely used as a shale inhibitor due to its advantages of low cost and obvious inhibition effect, however, the high addition amount of KCl may affect the ecological environment if the KCl is not subjected to appropriate treatment. In order to alleviate the environmental impact, the amine cations and derivatives thereof were utilized as shale inhibitors, but the performance of amine inhibitors was influenced by pH, which was detrimental to the on-site applications. The polyether amine was subsequently used as a shale inhibitor with desired inhibition performance, and a high-performance water-based drilling fluid was formed on the basis of the shale inhibitor, but the polyether amine had poor thermal stability and may be hydrolyzed and lose effectiveness at high temperature. Some acrylamide polymers were also utilized as shale inhibitors, but they were not environmentally friendly or had the defects such as poor inhibitive property.

SUMMARY

The present disclosure aims to provide a modified polyhistidine suitable for being used as a supramolecular shale inhibitor, a method for preparing the same, and an application of the modified polyhistidine in water-based drilling fluids. As a shale inhibitor, the modified polyhistidine has the advantages of environmental friendliness, excellent inhibition effect and stability.

In order to fulfill the above purposes, a first aspect of the present disclosure provides a modified polyhistidine suitable for being used as a supramolecular shale inhibitor, wherein the modified polyhistidine has a histidine polymerization main chain comprising a structural unit, which is represented by Formula (1) and attached with a modifying group; the histidine polymerization main chain has a histidine polymerization degree of 6-9;

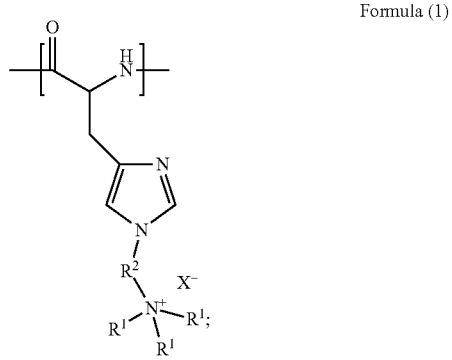

Formula (1)

each $R^1$ is independently selected from $C_1$-$C_6$ alkyl groups; X is selected from halogen; $R^2$ is selected from hydroxy substituted $C_3$-$C_{10}$ alkylidene groups.

A second aspect of the present disclosure provides a method of preparing the aforementioned modified polyhistidine, the method comprises:

(1) subjecting the histidine or a salt thereof to a dehydration condensation reaction under an alkaline condition to obtain polyhistidine;

(2) performing contact reaction of a compound represented by Formula (1') and the polyhistidine in an aqueous solvent;

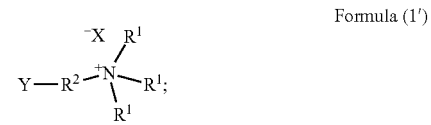

Formula (1')

Y is halogen, preferably Cl, Br or I.

A third aspect of the present disclosure provides an application of the aforementioned modified polyhistidine as a supramolecular shale inhibitor in water-based drilling fluids.

A fourth aspect of the present disclosure provides a water-based drilling fluid comprising the aforementioned modified polyhistidine as a supramolecular shale inhibitor.

A fifth aspect of the present disclosure provides an application of the aforementioned water-based drilling fluid in the oil and gas well drilling.

The modified polyhistidine provided by the present disclosure is a degradable biological material and has the advantage of environmental friendliness; when the modified polyhistidine is used as a shale inhibitor, it can take advantage of its supermolecular property to effectively inhibit the hydration expansion of montmorillonite which is the most important expansion mineral in shale, and exhibits excellent inhibition effect and desirable temperature resistance, thus it is conducive to promote development of the water-based drilling fluid in shale gas drilling, and provides powerful support for smooth extraction of the shale gas.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The present disclosure provides a modified polyhistidine suitable for being used as a supermolecular shale inhibitor, wherein the modified polyhistidine has a histidine polymerization main chain comprising a structural unit, which is represented by Formula (1) and attached with a modifying group;

the histidine polymerization main chain has a histidine polymerization degree of 6-9;

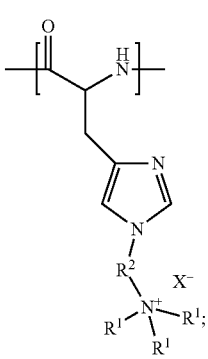

Formula (1)

each $R^1$ is independently selected from $C_1$-$C_6$ alkyl groups; X is selected from halogen; $R^2$ is selected from hydroxy substituted $C_3$-$C_{10}$ alkylidene groups.

According to the present disclosure, the aforementioned method will be used for preparing a modified polyhistidine with supramolecular characteristics, when the modified polyhistidine is used as a shale inhibitor of a water-based drilling fluid, the modified polyhistidine can perform a strong inhibition effect with the shale formation through intermolecular forces such as its electrostatic force, hydrogen bond, hydrophobic effect; in addition, the modified polyhistidine with supramolecular characteristics can also maintain higher chemical stability by virtue of its intermolecular acting force, thus it is beneficial to the long-term drilling operations.

According to the present disclosure, the specific examples of said $C_3$-$C_{10}$ alkylidene groups may include: $C_3$ alkylidene group, $C_4$ alkylidene group, $C_5$ alkylidene group, $C_6$ alkylidene group, $C_7$ alkylidene group, $C_8$ alkylidene group, $C_9$ alkylidene group, $C_{10}$ alkylidene group; the $C_3$-$C_8$ alkylidene groups may be adaptively selected from the specific examples mentioned above.

The specific examples of said $C_1$-$C_6$ alkyl groups may include: $C_1$ alkyl group, $C_2$ alkyl group, $C_3$ alkyl group, $C_4$ alkyl group, $C_5$ alkyl group, $C_6$ alkyl group; the $C_1$-$C_4$ alkyl groups may be adaptively selected from the specific examples mentioned above.

The specific examples of halogen may include F, Cl, Br, I.

According to the present disclosure, in order to obtain a shale inhibitor with excellent performances, preferably, each $R^1$ is independently selected from $C_1$-$C_4$ alkyl groups; $R^2$ is selected from hydroxy substituted $C_3$-$C_8$ alkylidene groups.

More preferably, each $R^1$ is independently selected from the group consisting of methyl, ethyl, n-propyl, isopropyl and n-butyl; X is Cl, Br or I; $R^2$ is selected from the group consisting of —$CH_2$—$CH(OH)$—$CH_2$—, —$CH_2$—$CH_2$—$CH(OH)$—, —$CH(OH)$—$CH_2$—$CH_2$—, —$CH_2$—$CH_2$—$CH(OH)$—$CH_2$—, —$CH_2$—$CH(OH)$—$CH_2$—$CH_2$— or —$CH_2$—$CH_2$—$CH(OH)$—$CH_2$—$CH_2$—.

Wherein the structural unit represented by Formula (1) can be selected from specific structural units shown by the following Formulae:

Formula (1-1): in the Formula (1), each $R^1$ is methyl, X is Cl, $R^2$ is selected from —$CH_2$—$CH(OH)$—$CH_2$—;

Formula (1-2): in the Formula (1), each $R^1$ is methyl, X is Cl, $R^2$ is selected from —$CH_2$—$CH_2$—$CH(OH)$—;

Formula (1-3): in the Formula (1), each $R^1$ is methyl, X is Cl, $R^2$ is selected from —$CH(OH)$—$CH_2$—$CH_2$—;

Formula (1-4): in the Formula (1), each $R^1$ is methyl, X is Cl, $R^2$ is selected from —$CH_2$—$CH_2$—$CH(OH)$—$CH_2$—;

Formula (1-5): in the Formula (1), each $R^1$ is methyl, X is Cl, $R^2$ is selected from —$CH_2$—$CH(OH)$—$CH_2$—$CH_2$—;

Formula (1-6): in the Formula (1), each $R^1$ is methyl, X is Cl, $R^2$ is selected from —$CH_2$—$CH_2$—$CH(OH)$—$CH_2$—$CH_2$—;

Formula (1-7): in the Formula (1), each $R^1$ is ethyl, X is Cl, $R^2$ is selected from —$CH_2$—$CH(OH)$—$CH_2$—;

Formula (1-8): in the Formula (1), each $R^1$ is ethyl, X is Cl, $R^2$ is selected from —$CH_2$—$CH_2$—$CH(OH)$—;

Formula (1-9): in the Formula (1), each $R^1$ is ethyl, X is Cl, $R^2$ is selected from —$CH(OH)$—$CH_2$—$CH_2$—;

Formula (1-10): in the Formula (1), each $R^1$ is ethyl, X is Cl, $R^2$ is selected from —$CH_2$—$CH_2$—$CH(OH)$—$CH_2$—;

Formula (1-11): in the Formula (1), each $R^1$ is ethyl, X is Cl, $R^2$ is selected from —$CH_2$—$CH(OH)$—$CH_2$—$CH_2$—;

Formula (1-12): in the Formula (1), each $R^1$ is ethyl, X is Cl, $R^2$ is selected from —$CH_2$—$CH_2$—$CH(OH)$—$CH_2$—$CH_2$—;

Formula (1-13): in the Formula (1), each $R^1$ is methyl, X is Br, $R^2$ is selected from —$CH_2$—$CH(OH)$—$CH_2$—;

Formula (1-14): in the Formula (1), each $R^1$ is methyl, X is Br, $R^2$ is selected from —$CH_2$—$CH_2$—$CH(OH)$—;

Formula (1-15): in the Formula (1), each $R^1$ is methyl, X is Br, $R^2$ is selected from —$CH(OH)$—$CH_2$—$CH_2$—;

Formula (1-16): in the Formula (1), each $R^1$ is methyl, X is Br, $R^2$ is selected from —$CH_2$—$CH_2$—$CH(OH)$—$CH_2$—;

Formula (1-17): in the Formula (1), each $R^1$ is methyl, X is Br, $R^2$ is selected from —$CH_2$—$CH(OH)$—$CH_2$—$CH_2$—;

Formula (1-18): in the Formula (1), each $R^1$ is methyl, X is Br, $R^2$ is selected from —$CH_2$—$CH_2$—$CH(OH)$—$CH_2$—$CH_2$—;

Formula (1-19): in the Formula (1), each $R^1$ is ethyl, X is Br, $R^2$ is selected from —$CH_2$—$CH(OH)$—$CH_2$—;

Formula (1-20): in the Formula (1), each $R^1$ is ethyl, X is Br, $R^2$ is selected from —$CH_2$—$CH_2$—$CH(OH)$—;

Formula (1-21): in the Formula (1), each $R^1$ is ethyl, X is Br, $R^2$ is selected from —$CH(OH)$—$CH_2$—$CH_2$—;

Formula (1-22): in the Formula (1), each $R^1$ is ethyl, X is Br, $R^2$ is selected from —$CH_2$—$CH_2$—$CH(OH)$—$CH_2$—;

Formula (1-23): in the Formula (1), each $R^1$ is ethyl, X is Br, $R^2$ is selected from —$CH_2$—$CH(OH)$—$CH_2$—$CH_2$—;

Formula (1-24): in the Formula (1), each $R^1$ is ethyl, X is Br, $R^2$ is selected from —$CH_2$—$CH_2$—$CH(OH)$—$CH_2$—$CH_2$—.

In order to obtain shale inhibitors that are more suitable for water-based drilling fluids according to the present disclosure, it is preferable that the histidine polymerization main chain has a histidine polymerization degree of 7-8. The polymerization degree refers to the number of histidine structural units of the histidine polymerization main chain in each molecule modified polyhistidine, and the histidine polymerization main chain is generally formed by conventional dehydration condensation of polyamino acids, therefore, the histidine structural units are linked with amide bonds. It is understandable that the modified polyhistidine of the present disclosure is a linear polymer.

According to the present disclosure, it is preferable that the content of the structural unit represented by Formula (1) is 20 mol % or more, preferably 20-60 mol %, more preferably 40-60 mol %. The molar content is based on the total mole number of all histidine structural units of the histidine polymerization main chain, including the aforementioned histidine structural unit which is represented by Formula (1) and attached with the modification group.

A second aspect of the present disclosure provides a method of preparing the aforementioned modified polyhistidine, the method comprises:

(1) subjecting the histidine or a salt thereof to a dehydration condensation reaction under an alkaline condition to obtain polyhistidine;

(2) performing contact reaction of a compound represented by Formula (1') and the polyhistidine in an aqueous solvent;

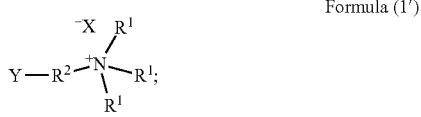

Formula (1')

Y is halogen, preferably Cl, Br or I.

According to the present disclosure, the aforementioned compound represented by the Formula (1') can be appropriately selected depending on the structure of the modifying group of the structural unit represented by the Formula (1).

Wherein the compound represented by the Formula (1') may be selected from compounds represented by the following specific structures:

Formula (1'-1): in the Formula (1'), each $R^1$ is methyl, X is Cl, $R^2$ is selected from —$CH_2$—CH(OH)—$CH_2$—, and Y is Cl (namely 3-chloro-2-hydroxypropyl trimethyl ammonium chloride);

Formula (1'-2): in the Formula (1'), each $R^1$ is methyl, X is Cl, $R^2$ is selected from —$CH_2$—$CH_2$—CH(OH)—, and Y is Cl (namely 3-chloro-1-hydroxypropyl trimethyl ammonium chloride);

Formula (1'-3): in the Formula (1'), each $R^1$ is methyl, X is Cl, $R^2$ is selected from —CH(OH)—$CH_2$—$CH_2$—, and Y is Cl (namely 3-chloro-3-hydroxypropyl trimethyl ammonium chloride);

Formula (1'-4): in the Formula (1'), each $R^1$ is methyl, X is Cl, $R^2$ is selected from —$CH_2$—$CH_2$—CH(OH)—$CH_2$—, and Y is Cl (namely 4-chloro-2-hydroxybutyl trimethyl ammonium chloride);

Formula (1'-5): in the Formula (1'), each $R^1$ is methyl, X is Cl, $R^2$ is selected from —$CH_2$—CH(OH)—$CH_2$—$CH_2$—, and Y is Cl;

Formula (1'-6): in the Formula (1'), each $R^1$ is methyl, X is Cl, $R^2$ is selected from —$CH_2$—$CH_2$—CH(OH)—$CH_2$—, and Y is Cl;

Formula (1'-7): in the Formula (1'), each $R^1$ is ethyl, X is Cl, $R^2$ is selected from —$CH_2$—CH(OH)—$CH_2$—, and Y is Cl;

Formula (1'-8): in the Formula (1'), each $R^1$ is ethyl, X is Cl, $R^2$ is selected from —$CH_2$—$CH_2$—CH(OH)—, and Y is Cl;

Formula (1'-9): in the Formula (1'), each $R^1$ is ethyl, X is Cl, $R^2$ is selected from —CH(OH)—$CH_2$—$CH_2$—, and Y is Cl;

Formula (1'40): in the Formula (1'), each $R^1$ is ethyl, X is Cl, $R^2$ is selected from —$CH_2$—$CH_2$—CH(OH)—$CH_2$—, and Y is Cl;

Formula (1'-11): in the Formula (1'), each $R^1$ is ethyl, X is Cl, $R^2$ is selected from —$CH_2$—CH(OH)—$CH_2$—$CH_2$—, and Y is Cl;

Formula (1'-12): in the Formula (1'), each $R^1$ is ethyl, X is Cl, $R^2$ is selected from —$CH_2$—$CH_2$—CH(OH)—$CH_2$—, and Y is Cl;

Formula (1'-13): in the Formula (1'), each $R^1$ is methyl, X is Br, $R^2$ is selected from —$CH_2$—CH(OH)—$CH_2$—, and Y is Cl;

Formula (1'-14): in the Formula (1'), each $R^1$ is methyl, X is Br, $R^2$ is selected from —$CH_2$—$CH_2$—CH(OH)—, and Y is Cl;

Formula (1'-15): in the Formula (1'), each $R^1$ is methyl, X is Br, $R^2$ is selected from —CH(OH)—$CH_2$—$CH_2$—, and Y is Cl;

Formula (1'-16): in the Formula (1'), each $R^1$ is methyl, X is Br, $R^2$ is selected from —$CH_2$—$CH_2$—CH(OH)—$CH_2$—, and Y is Cl;

Formula (1'-17): in the Formula (1'), each $R^1$ is methyl, X is Br, $R^2$ is selected from —$CH_2$—CH(OH)—$CH_2$—$CH_2$—, and Y is Cl;

Formula (1'-18): in the Formula (1'), each $R^1$ is methyl, X is Br, $R^2$ is selected from —$CH_2$—$CH_2$—CH(OH)—$CH_2$—, and Y is Cl;

Formula (1'-19): in the Formula (1'), each $R^1$ is ethyl, X is Br, $R^2$ is selected from —$CH_2$—CH(OH)—$CH_2$—, and Y is Cl;

Formula (1'-20): in the Formula (1'), each $R^1$ is ethyl, X is Br, $R^2$ is selected from —$CH_2$—$CH_2$—CH(OH)—, and Y is Cl;

Formula (1'-21): in the Formula (1'), each $R^1$ is ethyl, X is Br, $R^2$ is selected from —CH(OH)—$CH_2$—$CH_2$—, and Y is Cl;

Formula (1'-22): in the Formula (1'), each $R^1$ is ethyl, X is Br, $R^2$ is selected from —$CH_2$—$CH_2$—CH(OH)—$CH_2$—, and Y is Cl;

Formula (1'-23): in the Formula (1'), each $R^1$ is ethyl, X is Br, $R^2$ is selected from —$CH_2$—CH(OH)—$CH_2$—$CH_2$—, and Y is Cl;

Formula (1'-24): in the Formula (1'), each $R^1$ is ethyl, X is Br, $R^2$ is selected from —$CH_2$—$CH_2$—CH(OH)—$CH_2$—, and Y is Cl;

Formula (1'-25): in the Formula (1'), each $R^1$ is methyl, X is Cl, $R^2$ is selected from —$CH_2$—CH(OH)—$CH_2$—, and Y is Br;

Formula (1'-26): in the Formula (1'), each $R^1$ is methyl, X is Cl, $R^2$ is selected from —$CH_2$—$CH_2$—CH(OH)—, and Y is Br;

Formula (1'-27): in the Formula (1'), each $R^1$ is methyl, X is Cl, $R^2$ is selected from —CH(OH)—$CH_2$—$CH_2$—, and Y is Br;

Formula (1'-28): in the Formula (1'), each $R^1$ is methyl, X is Cl, $R^2$ is selected from —$CH_2$—$CH_2$—CH(OH)—$CH_2$—, and Y is Br;

Formula (1'-29): in the Formula (1'), each $R^1$ is methyl, X is Cl, $R^2$ is selected from —$CH_2$—CH(OH)—$CH_2$—$CH_2$—, and Y is Br;

Formula (1'-30): in the Formula (1'), each $R^1$ is methyl, X is Cl, $R^2$ is selected from —$CH_2$—$CH_2$—CH(OH)—$CH_2$—$CH_2$—, and Y is Br;

Formula (1'-31): in the Formula (1'), each $R^1$ is ethyl, X is Cl, $R^2$ is selected from —$CH_2$—CH(OH)—$CH_2$—, and Y is Br;

Formula (1'-32): in the Formula (1'), each $R^1$ is ethyl, X is Cl, $R^2$ is selected from —$CH_2$—$CH_2$—CH(OH)—, and Y is Br;

Formula (1'-33): in the Formula (1'), each $R^1$ is ethyl, X is Cl, $R^2$ is selected from —CH(OH)—$CH_2$—$CH_2$—, and Y is Br;

Formula (1'-34): in the Formula (1'), each $R^1$ is ethyl, X is Cl, $R^2$ is selected from —$CH_2$—$CH_2$—CH(OH)—$CH_2$—, and Y is Br;

Formula (1'-35): in the Formula (1'), each $R^1$ is ethyl, X is Cl, $R^2$ is selected from —$CH_2$—CH(OH)—$CH_2$—$CH_2$—, and Y is Br;

Formula (1'-36): in the Formula (1'), each $R^1$ is ethyl, X is Cl, $R^2$ 35742.04105 is selected from —$CH_2$—$CH_2$—CH(OH)—$CH_2$—$CH_2$—, and Y is Br;

Formula (1'-37): in the Formula (1'), each $R^1$ is methyl, X is Br, $R^2$ is selected from —$CH_2$—CH(OH)—$CH_2$—, and Y is Br;

Formula (1'-38): in the Formula (1'), each $R^1$ is methyl, X is Br, $R^2$ is selected from —$CH_2$—$CH_2$—CH(OH)—, and Y is Br;

Formula (1'-39): in the Formula (1'), each $R^1$ is methyl, X is Br, $R^2$ is selected from —CH(OH)—$CH_2$—$CH_2$—, and Y is Br;

Formula (1'-40): in the Formula (1'), each $R^1$ is methyl, X is Br, $R^2$ is selected from —$CH_2$—$CH_2$—CH(OH)—$CH_2$—, and Y is Br;

Formula (1'-41): in the Formula (1'), each $R^1$ is methyl, X is Br, $R^2$ is selected from —$CH_2$—CH(OH)—$CH_2$—$CH_2$—, and Y is Br;

Formula (1'-42): in the Formula (1'), each $R^1$ is methyl, X is Br, $R^2$ is selected from —$CH_2$—$CH_2$—CH(OH)—$CH_2$—$CH_2$—, and Y is Br;

Formula (1'-43): in the Formula (1'), each $R^1$ is ethyl, X is Br, $R^2$ is selected from —$CH_2$—CH(OH)—$CH_2$—, and Y is Br;

Formula (1'-44): in the Formula (1'), each $R^1$ is ethyl, X is Br, $R^2$ is selected from —$CH_2$—$CH_2$—CH(OH)—, and Y is Br;

Formula (1'-45): in the Formula (1'), each $R^1$ is ethyl, X is Br, $R^2$ is selected from —CH(OH)—$CH_2$—$CH_2$—, and Y is Br;

Formula (1'-46): in the Formula (1'), each $R^1$ is ethyl, X is Br, $R^2$ is selected from —$CH_2$—$CH_2$—CH(OH)—$CH_2$—, and Y is Br;

Formula (1'-47): in the Formula (1'), each $R^1$ is ethyl, X is Br, $R^2$ is selected from —$CH_2$—CH(OH)—$CH_2$—$CH_2$—, and Y is Br;

Formula (1'-48): in the Formula (1'), each $R^1$ is ethyl, X is Br, $R^2$ is selected from —$CH_2$—$CH_2$—CH(OH)—$CH_2$—$CH_2$—, and Y is Br.

According to the present disclosure, the histidine or a salt thereof may be one or more selected from the group consisting of histidine and histidine hydrochloride, and the like. As long as it can be used as a histidine material for preparing the polyhistidine.

According to the present disclosure, histidine in step (1) is subjected to spontaneous condensation polymerization through the dehydration condensation reaction to form a polyhistidine chain, wherein the alkaline condition can be provided by an alkaline compound, and such an alkaline compound can be selected from various compounds being capable of providing alkaline condition, and preferably, the alkaline compound is one or more selected from the group consisting of sodium hydroxide, potassium hydroxide and lithium hydroxide. The alkaline compound may be provided in the form of an aqueous solution thereof, for example, in the form of an aqueous solution of the alkaline compound having a concentration of 40-60 wt %. The amount of the aqueous solution of the alkaline compound may vary within a wide scope, it is preferably that the aqueous solution of the alkaline compound is used in an amount of 10-60 parts, relative to 100 parts by weight of histidine or a salt thereof.

According to the present disclosure, it is preferable that the conditions of the dehydration condensation reaction include: the temperature is 180-250° C., preferably 200-230° C.; the time is 2-6 h, preferably 3.5-6 h.

According to the present disclosure, step (2) comprises an reaction of the polyhistidine obtained in step (1) with the compound represented by Formula (1'), the modifying group provided by the compound represented by Formula (1') can be attached to the histidine structural unit, such that a histidine polymerization main chain of the modified polyhistidine of the present disclosure comprises a structural unit, which is represented by Formula (1) and attached with a modifying group; wherein the amount ratio between the histidine or a salt thereof and the compound represented by Formula (1') may be adaptively adjusted according to the modified polyhistidine required by the present disclosure, it is preferable that the molar ratio of the histidine or a salt thereof to the compound represented by Formula (1') is 1: 0.5-5, preferably 1: 0.6-3, more preferably 1: 1.01-2.55.

Wherein the aqueous solvent may be water, or an aqueous solution containing other solvent which does not affect the reaction of the present disclosure. The amount of the aqueous solvent may vary within a wide scope, the amount of aqueous solvent is preferably 100-500 mL, more preferably 120-250 mL, relative to 10 g of histidine.

According to the present disclosure, the polyhistidine can be dissolved in the aqueous solvent and then the compound represented by Formula (1') may be introduced for carrying out the contact reaction. Preferably, the aqueous solution of polyhistidine is initially added with the aforementioned alkaline compound, preferably in an amount of 5-20 parts by weight with respect to 100 parts by weight of histidine, and then the compound represented by Formula (1') is introduced to perform the contact reaction.

According to the present disclosure, it is preferable that the conditions of the contact reaction include: the temperature is 45-80° C. and the time is 2-15 h.

A third aspect of the present disclosure provides an application of the aforementioned modified polyhistidine as a supramolecular shale inhibitor in water-based drilling fluids.

When the aforementioned modified polyhistidine of the present application is used as a supermolecular shale inhibitor in a water-based drilling fluid, it will produce excellent shale inhibition effect, and exhibit desirable temperature resistance.

A fourth aspect of the present disclosure provides a water-based drilling fluid comprising the aforementioned modified polyhistidine as a supramolecular shale inhibitor.

According to the present disclosure, a low amount of the supramolecular shale inhibitor can perform excellent shale inhibition effect, and preferably, the amount of the supramolecular shale inhibitor is 1-3 parts by weight relative to 100 parts by weight of water in the water-based drilling fluid.

The water-based drilling fluid according to the present disclosure may further comprise other additives conventionally used in the technical field, such as bentonite, a tackifier, an anti-sloughing agent, a lubricant, a weighting agent, an alkaline modifier, the kind and content of such additives may be those conventionally used in the art, the present disclosure does not impose a specific limitation thereto.

A fifth aspect of the present disclosure provides an application of the aforementioned water-based drilling fluid in the oil and gas well drilling.

When the drilling fluid provided by the present disclosure is applied in the oil and gas well drilling operations, it can effectively inhibit the shale expansion, and exhibit an excellent inhibition effect, and produce the desirable high-temperature inhibition effect.

The present disclosure will be described in detail below with reference to examples.

Example 1

The example aims to illustrate a modified polyhistidine of the present application and a method of preparing the same.

(1) 10 g of histidine hydrochloride was weighted and placed in a culture dish, 4 g NaOH aqueous solution with a concentration of 50 wt % was then added; the mixture was placed in a muffle furnace, and heated to a temperature of 200° C. and subjected to reaction for 4 hours, the mixture was stirred once for every half an hour to obtain the polyhistidine, which was identified to have a histidine polymerization degree of 7;

(2) the obtained polyhistidine was dissolved in 150 mL of water, 1.0 g NaOH was then added; 10 g of 3-chloro-2-hydroxypropyl trimethyl ammonium chloride was subsequently weighed and added into the polyhistidine solution, the mixture was stirred uniformly, and heated to a temperature of 50° C. and subjected to reaction for 6 hours; the obtained product was subjected to drying and grinding process to prepare the supermolecular inhibitor SI-1, and the supermolecular inhibitor was identified to contain the quaternary ammonium salt group in a molar content of 41 mol %.

Example 2

The example aims to illustrate a modified polyhistidine of the present application and a method of preparing the same.

(1) 10 g of histidine hydrochloride was weighted and placed in a culture dish, 4 g NaOH aqueous solution with a concentration of 50 wt % was then added; the mixture was placed in a muffle furnace, and heated to a temperature of 220° C. and subjected to reaction for 3.5 hours, the mixture was stirred once for every half an hour to obtain the polyhistidine, which was identified to have a histidine polymerization degree of 8;

(2) the obtained polyhistidine was dissolved in 150 mL of water, 1.0 g NaOH was then added; 25 g of 3-chloro-2-hydroxypropyl trimethyl ammonium chloride was subsequently weighed and added into the polyhistidine solution, the mixture was stirred uniformly, and heated to a temperature of 65° C. and subjected to reaction for 8 hours; the obtained product was subjected to drying and grinding process to prepare the supermolecular inhibitor SI-2, and the supermolecular inhibitor was identified to contain the quaternary ammonium salt group in a molar content of 56 mol %.

Example 3

The example aims to illustrate a modified polyhistidine of the present application and a method of preparing the same.

The modified polyhistidine was prepared according to the same method of Example 1, except that in step (1), the reaction conditions in the muffle furnace were different, namely the mixture was heated to a temperature of 250° C. and subjected to reaction for 4 hours, thereby obtaining the polyhistidine having a histidine polymerization degree of 9; the step (2) was performed to finally prepare the supermolecular inhibitor SI-3.

Example 4

The example aims to illustrate a modified polyhistidine of the present application and a method of preparing the same.

The modified polyhistidine was prepared according to the same method of Example 1, except that in step (1), the reaction conditions in the muffle furnace were different, namely the mixture was heated to a temperature of 180° C. and subjected to reaction for 3.5 hours, thereby obtaining the polyhistidine having a histidine polymerization degree of 6; the step (2) was performed to finally prepare the supermolecular inhibitor SI-4.

Example 5

The example aims to illustrate a modified polyhistidine of the present application and a method of preparing the same.

The modified polyhistidine was prepared according to the same method of Example 1, except that in step (2), 5 g 3-chloro-2-hydroxypropyltrimethyl ammonium chloride was used, the step (2) was performed to finally prepare the supermolecular inhibitor SI-5, and the supermolecular inhibitor was identified to contain the quaternary ammonium salt group in a molar content of 22 mol %.

Comparative Example 1

The modified polyhistidine was prepared according to the same method of Example 1, except that in step (1), the reaction conditions in the muffle furnace were different, namely the mixture was heated to a temperature of 280° C. and subjected to reaction for 4 hours, thereby obtaining the polyhistidine having a histidine polymerization degree of 12; the step (2) was performed to finally prepare the supermolecular inhibitor DSI-1.

Comparative Example 2

The modified polyhistidine was prepared according to the same method of Example 1, except that in step (1), the reaction conditions in the muffle furnace were different, namely the mixture was heated to a temperature of 150° C. and subjected to reaction for 4 hours, thereby obtaining the polyhistidine having a histidine polymerization degree of 4; the step (2) was performed to finally prepare the supermolecular inhibitor DSI-2.

Test Example 1

The aforementioned inhibitors, potassium chloride and polyether amine (purchased from Energy Chemical Co., Ltd.

(Beijing). analytically pure) were respectively prepared into an aqueous solution with a concentration of 1 wt %, the obtained solutions and clear water were used for evaluating inhibitory property of the inhibitors by measuring the 24 h swelling height of the manually pressed bentonite block with a shale swelling tester according to the industry standard (SY/T 6335-1997) concerning the shale inhibition evaluation method.

TABLE 1

| The liquid to be measured | Expansion amount for 2 h, mm | Expansion amount for 12 h, mm | Expansion amount for 24 h, mm |
|---|---|---|---|
| Clear water | 2.36 | 5.01 | 6.65 |
| SI-1 | 0.46 | 1.83 | 2.95 |
| SI-2 | 0.39 | 1.58 | 2.36 |
| SI-3 | 0.57 | 2.06 | 3.23 |
| SI-4 | 0.51 | 1.92 | 3.16 |
| SI-5 | 0.68 | 2.16 | 3.52 |
| DSI-1 | 0.98 | 2.91 | 4.77 |
| DSI-2 | 0.90 | 2.76 | 4.46 |
| Potassium chloride | 0.77 | 2.41 | 3.94 |
| Polyether amine | 0.72 | 2.30 | 3.86 |

As shown by the data in Table 1, the modified polyhistidine prepared with the method of the present disclosure can produce excellent shale inhibition effect in the water-based drilling fluids.

Test Example 2

20 g of shale rock debris (passing through a 6-10 mesh screen) was taken, and was put into an aqueous solution of the inhibitors with a concentration of 2 wt % and the clear water respectively, the inhibitors herein refer to the inhibitors prepared in the above text, potassium chloride and polyether amine (purchased from Energy Chemical Co., Ltd. (Beijing) analytically pure); the mixture was then placed in an aging tank and subjected to hot rolling at a temperature of 120° C. or 150° C. for 16 h, the rock debris in the inhibitor solution after the hot rolling process was sieved through a 40-mesh sieve, the rock debris remained on the sieve was dried and its mass ($m_1$) was weighed, wherein the rolling recovery rate (R) may be calculated according to the following Formula:

Rolling recovery rate (R)=($m_1$/20)×100%, the results were shown in Table 2.

TABLE 2

| The liquid to be measured | Rolling recovery rate at 120° C. (%) | Rolling recovery rate at 150° C. (%) |
|---|---|---|
| Clear water | 26.5 | 23.6 |
| SI-1 | 92.3 | 90.1 |
| SI-2 | 97.7 | 96.2 |
| SI-3 | 73.6 | 65.8 |
| SI-4 | 86.2 | 80.1 |
| SI-5 | 68.4 | 52.1 |
| DSI-1 | 38.3 | 26.8 |
| DSI-2 | 42.5 | 29.3 |
| Potassium chloride | 35.4 | 30.9 |
| Polyether amine | 78.2 | 74.3 |

As illustrated by the data in Table 2, the modified polyhistidine prepared with the method of the present disclosure can exhibit desirable temperature resistance when used as a shale inhibitor in a water-based drilling fluid.

Test Example 3

The inhibitors prepared in the above text were respectively added into a 4 wt % clay solution, such that the content of the inhibitors was 0.5 wt %, the mixed solution was subjected to the ultrasonic vibration for 20 min to be uniformly dispersed, the Zeta potential and particle size distribution of the inhibitors relative to the clay were measured by using a Zeta potentiometer and a micron particle size distribution meter, the results were shown in Table 3.

TABLE 3

| Inhibitors | Zeta potential mV | D10 μm | D50 μm | D90 μm |
|---|---|---|---|---|
| SI-1 | −8.3 | 30.624 | 112.387 | 523.982 |
| SI-2 | −5.6 | 37.296 | 128.341 | 557.237 |
| SI-3 | −13.5 | 22.146 | 80.475 | 410.176 |
| SI-4 | −11.2 | 26.127 | 98.214 | 482.348 |
| SI-5 | −17.6 | 17.124 | 60.324 | 365.278 |
| DSI-1 | −27.9 | 15.387 | 50.249 | 310.218 |
| DSI-2 | −23.8 | 10.249 | 36.521 | 236.924 |
| Blank clay solution | −33.4 | 2.537 | 5.648 | 15.265 |

As shown from Table 3, the modified polyhistidine prepared with the method of the present disclosure, when used as a shale inhibitor, can adsorb clay particles on the particle surface through electrostatic acting force so as to reduce the Zeta potential of the clay particles, weaken the dispersibility of the clay particles, and produce the effect of inhibiting the hydration expansion of the expansive clay minerals, thereby controlling the hydration dispersion of shale.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A modified polyhistidine suitable for being used as a supramolecular shale inhibitor, wherein the modified polyhistidine has a histidine polymerization main chain comprising a structural unit, which is represented by Formula (1) and attached with a modifying group;

the histidine polymerization main chain has a histidine polymerization degree of 7-8;

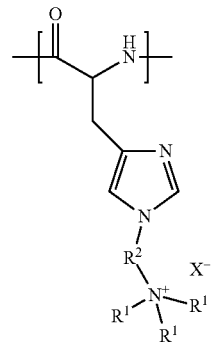

Formula (1)

each $R^1$ is independently selected from the group consisting of methyl, ethyl, n-propyl, isopropyl and n-butyl; X is Cl, Br or I; $R^2$ is selected from the group consisting of —$CH_2$—CH(OH)—$CH_2$—, —$CH_2$—$CH_2$—CH (OH)—, —CH(OH)—CH₂—CH₂—, —CH₂—CH₂—CH(OH)—CH₂—, —CH₂—CH(OH)—CH₂—CH₂— or —CH₂—CH₂—CH(OH)—CH₂—CH₂—;
the content of the structural unit represented by Formula (1) is 20 mol % or more.

2. The modified polyhistidine of claim 1, wherein the content of the structural unit represented by Formula (1) is 20-60 mol %.

3. The modified polyhistidine of claim 1, wherein the content of the structural unit represented by Formula (1) is 40-60 mol %.

4. A method of preparing the modified polyhistidine of claim 1, the method comprises:
   (1) subjecting histidine or a salt thereof to a dehydration condensation reaction under an alkaline condition to obtain polyhistidine, wherein the polyhistidine has a polymerization degree of 7-8;
   (2) performing contact reaction of a compound represented by Formula (1') and the polyhistidine in an aqueous solvent, wherein a molar ratio of the histidine or a salt thereof to the compound represented by Formula (1') is 1: 0.5-5;

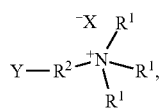  Formula (1')

wherein Y is halogen,
each R¹ is independently selected from the group consisting of methyl, ethyl, n-propyl, isopropyl and n-butyl; X is Cl, Br or I; R² is selected from the group consisting of —CH₂—CH(OH)—CH₂—, —CH₂—CH₂—CH(OH)—, —CH(OH)—CH₂—CH₂—, —CH₂—CH₂—CH(OH)—CH₂—, —CH₂—CH(OH)—CH₂—CH₂— or —CH₂—CH₂—CH(OH)—CH₂—CH₂—.

5. The method of claim 4, wherein Y is Cl, Br or I.

6. The method of claim 4, wherein the molar ratio of the histidine or a salt thereof to the compound represented by Formula (1') is 1:0.6-3.

7. The method of claim 4, wherein the molar ratio of the histidine or a salt thereof to the compound represented by Formula (1') is 1:1.01-2.55.

8. The method of claim 4, wherein the conditions of the dehydration condensation reaction include: the temperature is 180-250° C., the time is 2-6 h.

9. The method of claim 4, wherein the conditions of the contact reaction include: the temperature is 45-80° C., and the time is 2-15 h.

10. A water-based drilling fluid, comprising the modified polyhistidine of claim 1 as a supramolecular shale inhibitor.

* * * * *